(No Model.)
J. W. GAMBLE.
DRAFT EQUALIZER.
No. 472,448. Patented Apr. 5, 1892.
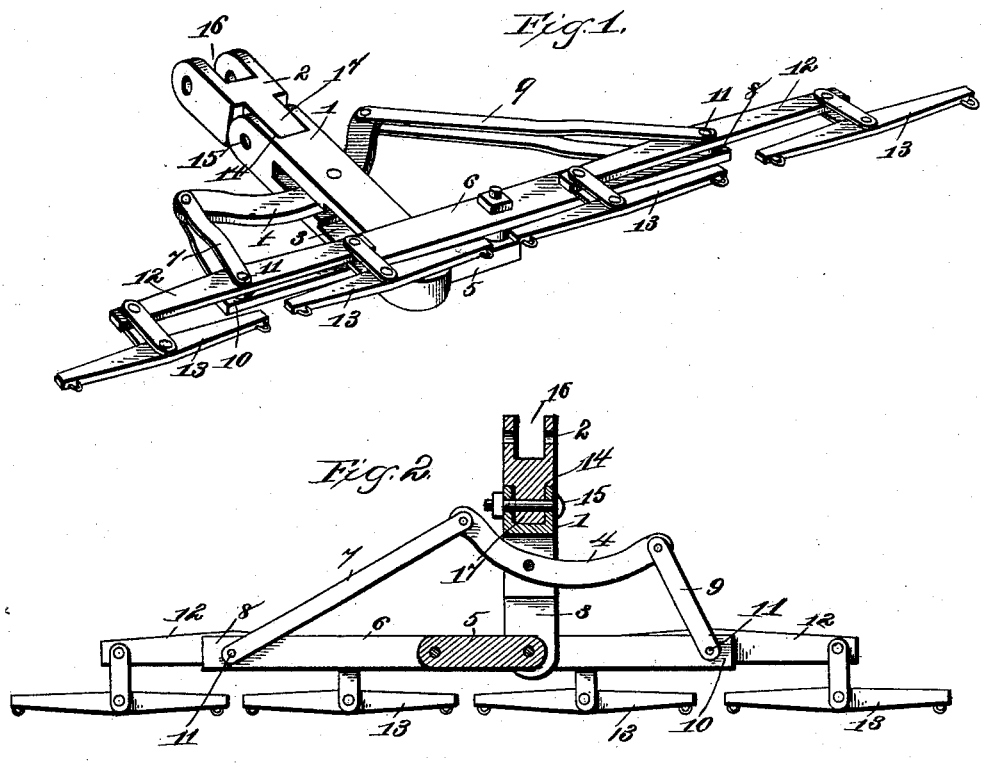
Witnesses
Inventor
Joseph W. Gamble
By his Attorneys,
C. A. Snow & Co.

UNITED STATES PATENT OFFICE.

JOSEPH W. GAMBLE, OF DES MOINES, IOWA, ASSIGNOR OF ONE-HALF TO JAMES T. R. GREEN, OF SAME PLACE.

DRAFT-EQUALIZER.

SPECIFICATION forming part of Letters Patent No. 472,448, dated April 5, 1892.

Application filed October 22, 1891. Serial No. 409,510. (No model.)

*To all whom it may concern:*

Be it known that I, JOSEPH W. GAMBLE, a citizen of the United States, residing at Des Moines, in the county of Polk and State of Iowa, have invented a new and useful Draft-Equalizer, of which the following is a specification.

The invention relates to improvements in draft-equalizers.

The object of the present invention is to simplify and improve the construction of draft-equalizers for plows and the like, and to provide one which will be so arranged as to permit one horse to work in a furrow and three to work on unplowed land, and which will equalize the draft of the horses.

A further object of the invention is to provide means whereby the draft-equalizer may be readily coupled to plows having either a vertical or a horizontal coupling-bolt.

The invention consists in the construction and novel combination and arrangement of parts hereinafter fully described, illustrated in the accompanying drawings, and pointed out in the claims hereto appended.

In the drawings, Figure 1 is a perspective view of a draft-equalizer constructed in accordance with this invention. Fig. 2 is a horizontal section view. Fig. 3 is a detail perspective view showing a modification of the tongue.

Like numerals of reference indicate corresponding parts in all the figures of the drawings.

1 designates a short tongue designed to be coupled to a plow by a clevis 2 and provided with a horizontally-disposed longitudinal slot 3, adapted for the reception of a hinged bracket-bar 4, to the outer end of which is pivoted a main whiffletree, and for the reception of a lever 5, which is connected with the ends of the main whiffletree 6. The hinged bracket-bar 4 is arranged at the front end of the slot 3 and has its inner end pivoted to the tongue and its outer end pivoted to the main whiffletree at an intermediate point of the same. The lever is slightly curved or bent to form a bell-crank lever and is arranged at the rear end of the slot and has its short arm connected by long draft-bars 7 with the end 8 of the main whiffletree, and its longer arm is connected by short draft-bars 9 with the other end 10 of the main whiffletree. The bolts 11, which connect the draft-rods to the main whiffletree, pivot doubletrees 12 to the main whiffletree, and singletrees 13 are connected in the usual manner to the ends of the doubletrees. The rear end of the tongue is provided with a socket or recess 14, in which is pivoted the clevis 2 by a bolt 15 and which may be formed by bifurcating the tongue, as shown in Figs. 1 and 2 of the drawings, or by forming a rectangular recess, as illustrated in Fig. 3 of the accompanying drawings. The clevis 2 has its rear end bifurcated to form a recess 16 and is provided at its front end with a squared projection 17, provided with perforations 18, arranged at right angles to each other and adapted for the reception of the bolt 15, whereby the clevis is connected to the tongue and is adapted to be turned to arrange its recess in a vertical or horizontal position to adapt the clevis to plows having vertical or horizontal coupling-bolts.

The draft-equalizer is simple, comparatively inexpensive in construction, is arranged so that one horse will work in a furrow and three on unplowed land, and it is adapted to be readily attached to plows having either vertically or horizontally disposed coupling-bolts.

The parts may be readily arranged to adapt the equalizer to either right or left hand plows.

What I claim is—

1. In a draft-equalizer, the combination of a tongue having a longitudinal slot, a hinged bracket-bar having one end arranged in the slot and pivotally connected to the tongue, a main whiffletree pivotally mounted on the outer end of the hinged bracket-bar, a lever fulcrumed in the slot, the draft-bars connected to the lever and the main whiffletree, and the doubletrees mounted on the ends of the main whiffletree and carrying singletrees, substantially as described.

2. In a draft-equalizer, the combination of the tongue provided at its rear end with a recess, and a clevis provided with a squared projection having perforations arranged at right angles and pivoted in the recess of the tongue and adapted to be turned therein, substantially as and for the purpose described.

In testimony that I claim the foregoing as my own I have hereto affixed my signature in the presence of two witnesses.

JOSEPH W. GAMBLE.

Witnesses:
H. G. EVERETT,
GEO. A. THOMPSON.